3,216,985
POLYMERIZATION OF VINYLCHLORIDE IN PRESENCE OF ALUMINUM TRIALKYL AND OXYGEN
Robert Büning, Cologne, Germany, assignor to Dynamit Nobel, A.G., Troisdorf, Bezirk Cologne, Germany, a corporation of Germany
No Drawing. Filed June 27, 1961, Ser. No. 131,952
Claims priority, application Germany, July 1, 1960, D 33,687
4 Claims. (Cl. 260—92.8)

This invention relates to a process for preparing vinylchloride polymerizates. More particularly, this invention relates to a process for preparing such polymerizates using as catalyst for the polymerization a partially oxidized metal organo compound.

Processes for the polymerization of vinylchloride in the presence of organo metal compounds and, in particular, of organo aluminum compounds are known. In copending application Serial No. 60,318, filed October 4, 1960, now abandoned, a process is described for carrying out the polymerization of vinylchloride in the presence of an organo aluminum compound AlRR'R", wherein R, R' and R" represent straight-chain alkyl radicals as, for example, aluminum triethyl and aluminum trimethyl.

It has now surprisingly been found, in accordance with the invention, that the polymerization of vinylchloride may be most advantageously effected in the presence of organo aluminum compounds AlRR'R", as above defined, in the form of their solutions in inert hydrocarbons and cyclic ether solvents through which oxygen or an oxygen-containing gas has been conducted.

The use of the catalyst of the invention, i.e., solutions of partially oxidized organo aluminum compounds, wherein the aluminum is substituted by straight-chain alkyl radicals, provides a means whereby, in the polymerization of vinylchloride, regulation of molecular weight and granular form of the polymerizate can be achieved. The size of the molecular weight, which is determined by means of the relative viscosity of the polymer, is dependent, on the one hand, on the solvent used and, on the other, on the quantity of oxygen employed in preparation of the catalyst. Still further, the choice of solvent influences not only the size of the molecular weight of the polymerizate recovered but, in addition, the granular form thereof.

Specifically with respect to the molecular weight, an increase in molecular weight is manifested in the following solvent sequence: dioxane, tetrahydrofurane, benzene, and petroleum ether. As concerns the granular form, an increase in the granular magnitude is evidenced in the same sequential arrangement of solvents. The process, in accordance with the invention, thereby makes possible a simple and effective means for regulating the molecular weight of the polyvinylchloride polymerizate as well as the means for obtaining that polymerizate in the form of granules having a specific size.

The organo aluminum compounds which may be used as polymerization catalysts in accordance with the invention have straight-chain alkyl radicals having from 1 to 8 carbon atoms as, for example, methyl, ethyl, propyl, butyl, hexyl, and octyl groups. Specifically advantageous are aluminum trimethyl and aluminum triethyl. There may, however, be utilized equally successfully catalysts in which the radicals corresponding to R, R' and R" are not identical straight-chain alkyl radicals.

Instances of solvents are the solvents above-noted: dioxane, tetrahydrofurane, benzene, petroleum ether, as well as other inert hydrocarbons and cyclic ethers.

The following examples are illustrative but not restrictive of the process of the present invention:

*Example 1*

2 kg. freshly distilled vinylchloride are introduced into a 3-liter reaction flask provided with a cooling coil dripping funnel and a stirrer, and which is cooled to —20° C. The stirrer is set in motion and there is added to the liquid vinylchloride a catalyst solution, which is prepared as follows:

2.5 g. aluminum triethyl are dissolved in 50 cc. absolute petroleum ether and thereafter there are conducted 44 cc. dry oxygen through this solution. The catalyst solution obtained in this manner is introduced dropwise into the liquid vinylchloride. After about 15 minutes the polymerization reaction visibly sets in and the first formed polymerizate is seen. After 7 hours of reaction time, the polymerization is interrupted by the addition of 150 cc. methanol in which 15 cc. concentrated hydrochloric acid have been dissolved. The polymerizate formed is separated, washed with water and thereafter with methanol. After drying at 50° C. in a drying cabinet, there is obtained 375 g. of polymerizate having a relative viscosity, measured in the form of its 1% solution in cyclohexanone at 20° C., of 19.4.

*Example 2*

Example 1 is repeated. However, 22 cc. dry oxygen are conducted through the catalyst solution. The yield of polymerizate amounts to 368 g. The polymerizate obtained has a relative viscosity of 11.2.

*Example 3*

Example 1 is again repeated, but, in this instance, 11 cc. of dry oxygen are conducted from the catalyst solution. The yield of polymerizate amounts to 370 g. The relative viscosity of the polymerizate thus obtained is 7.1.

*Example 4*

Example 1 is repeated but, in the preparation of the catalyst solution, 2.5 g. aluminum triethyl are dissolved in 45 cc. absolute dioxane. Thereafter, through its solution there are conducted 40 cc. of dry oxygen. The yield of polymerizate amounts to 365 g. The relative viscosity of the product is 6.2.

If 20 cc. of dry oxygen is passed through the aforesaid catalyst solution, there is obtained a polymerizate having a relative viscosity of 3.8.

The polymerizate obtained under these conditions is such that the polymerizate sinks to the bottom of the liquid vinylchloride during the polymerization process.

I claim:

1. Process for the production of homopolymerizates of vinylchloride, which process comprises polymerizing vinylchloride in the presence of a catalytic amount of a polymerization catalyst prepared by dissolving an organo aluminum compound having the formula AlRR'R" wherein R, R' and R" each represents a straight chain alkyl radical in a member selected from the group consisting of inert hydrocarbon and cyclic ether solvents through which solution oxygen has been passed.

2. Process according to claim 1 wherein said solvent is a member selected from the group consisting of dioxane, tetrahydrofurane, benzene and petroleum ether.

3. Process according to claim 1 wherein said organo aluminum compound is aluminum triethyl and said solvent is petroleum ether.

4. Process according to claim 1 wherein said organo aluminum compound is aluminum triethyl and said solvent is dioxane.

(References on following page)

References Cited by the Examiner

UNITED STATES PATENTS

| | | | |
|---|---|---|---|
| 2,822,357 | 2/58 | Brebner et al. | |
| 3,069,403 | 12/62 | Prapas | 260—89.1 |
| 3,073,808 | 1/63 | Mertz | 260—92.8 |
| 3,076,794 | 2/63 | Schnack et al. | 260—92.8 |
| 3,117,112 | 1/64 | Mirable et al. | 260—89.5 |

FOREIGN PATENTS 566,532  1/59  Belgium.

LEON J. BERCOVITZ, *Primary Examiner.*

HAROLD N. BURSTEIN, DONALD E. CZAJA,
*Examiners.*